(12) United States Patent
Davey

(10) Patent No.: US 11,672,192 B2
(45) Date of Patent: Jun. 13, 2023

(54) ELECTROMAGNETIC FREQUENCY (EMF) DETECTING SAFETY SHOVEL FOR DETECTING THE PRESENCE OF SUBSURFACE POWER CABLES DURING EXCAVATION

(71) Applicant: BRP GROUP PTY LTD, Dromana (AU)

(72) Inventor: Brenton Davey, Mt. Martha (AU)

(73) Assignee: BRP GROUP PTY LTD, Dromana (AU)

( * ) Notice: Subject to any disclaimer, the term of this patent is extended or adjusted under 35 U.S.C. 154(b) by 559 days.

(21) Appl. No.: 15/733,063

(22) PCT Filed: Nov. 6, 2018

(86) PCT No.: PCT/AU2018/051199
§ 371 (c)(1),
(2) Date: May 5, 2020

(87) PCT Pub. No.: WO2019/084631
PCT Pub. Date: May 9, 2019

(65) Prior Publication Data
US 2020/0288618 A1  Sep. 17, 2020

(30) Foreign Application Priority Data

Nov. 6, 2017  (AU) .............................. 2017904496

(51) Int. Cl.
*A01B 1/02* (2006.01)
*A01B 76/00* (2006.01)
*G01V 3/08* (2006.01)

(52) U.S. Cl.
CPC ................ *A01B 1/02* (2013.01); *A01B 76/00* (2013.01); *G01V 3/08* (2013.01); *G01V 3/088* (2013.01)

(58) Field of Classification Search
CPC . A01B 1/02; A01B 76/00; G01V 3/08; G01V 3/088
(Continued)

(56) References Cited

U.S. PATENT DOCUMENTS 4,233,561 A * 11/1980 Haddon .................... H03H 7/38
                                                   333/17.3
5,669,649 A *  9/1997 Metcalf .................... A01B 1/02
                                                    294/49
(Continued)

FOREIGN PATENT DOCUMENTS

GB          2554891 A  *  4/2018  ............... A01B 1/02

OTHER PUBLICATIONS

International Search Report dated Feb. 11, 2019 from PCT Application No. PCT/AU2018/051199.

*Primary Examiner* — Dean J Kramer
(74) *Attorney, Agent, or Firm* — Innovation Capital Law Group, LLP; Vic Lin

(57) ABSTRACT

An EMF detecting safety shovel has electromagnetic field (EMF) detection circuitry operably coupled to a blade thereof for measuring changes in EMF over time (AC fields) which may be used by spotters during excavation work for detection of subsurface power supply cables. The safety shovel may be further configured for classifying different types of subsurface power cables wherein the EMF detector circuit may be configured for discriminating between low and high voltage subsurface power cables when the edge of the blade is within a certain distance thereof, and the EMF detector circuit may be adjusted to adjust the distance for use with differing conduit diameters. The EMF detector circuit may also employ bandpass filtering to discriminate between single and three phase power supplies. In this way, the (Continued)

present safety shovel may provide indication of the presence of subsurface power supply cables and also the type thereof.

26 Claims, 2 Drawing Sheets

(58) Field of Classification Search
USPC .............................................. 294/49, 51, 59
See application file for complete search history.

(56) References Cited

U.S. PATENT DOCUMENTS

| | | |
|---|---|---|
| 7,741,848 B1 * | 6/2010 | Olsson .................... G01V 3/102 |
| | | 702/76 |
| 8,708,382 B2 | 4/2014 | Hernandez |
| 2006/0255808 A1 * | 11/2006 | Schmitzer ................ G01V 3/15 |
| | | 324/326 |
| 2010/0207633 A1 | 8/2010 | Fling et al. |
| 2010/0321021 A1 | 12/2010 | Siegel |
| 2015/0234076 A1 | 8/2015 | Overby et al. |

* cited by examiner

ELECTROMAGNETIC FREQUENCY (EMF) DETECTING SAFETY SHOVEL FOR DETECTING THE PRESENCE OF SUBSURFACE POWER CABLES DURING EXCAVATION

FIELD OF THE INVENTION

This invention relates generally to an electromagnetic frequency (EMF) detecting safety shovel for detecting the presence of subsurface power cables during excavation.

BACKGROUND OF THE INVENTION

Undetected subsurface power cables may be hazardous during excavation, especially when using mechanical excavators. Conventional arrangements for mitigating against such hazards comprise having a spotter who inspects the pit should the mechanical excavator operator feel an obstruction during excavation. The spotter may inspect the pit with an insulated spotter shovel to investigate the cause of obstruction.

U.S. Pat. No. 8,708,382 B2 (RIGOBERTO HERNANDEZ) 29 Apr. 2014 [hereinafter referred to as Dl] discloses an electronic device which may be electrically connected to a shank of a shovel to detect changes in electromagnetic fields over time (AC fields) and therefore the presence of subsurface AC power cable.

It would however be advantageous to be able to accurately classify different types of subsurface power cables.

It is to be understood that, if any prior art information is referred to herein, such reference does not constitute an admission that the information forms part of the common general knowledge in the art, in Australia or any other country.

SUMMARY OF THE DISCLOSURE

There is provided herein an EMF detecting safety shovel comprising a handle and a blade at a working end thereof which may be used by spotters during excavation work for detection of subsurface power supply cables.

The present safety shovel comprises electromagnetic field (EMF) detection circuitry configured for measuring changes in EMF over time (AC fields). The circuit comprises an antenna formed by a blade or being attached conductively or non-conductively to the blade for picking up EMF signals. An EMF detector circuit is operably coupled to the antenna which provides an indication of the detection of EMF of a subsurface power cable using an indicator.

In a preferred embodiment, the present safety shovel is further configured for classifying different types of subsurface power cables. In an embodiment, the EMF detector circuit is configured for discriminating between low and high voltage power cables. For example, the EMF detector circuit may be configured for discriminating between low-voltage power cables having a supply voltage of less than approximately 1000 V and high-voltage power supply cables having a supply voltage of greater than 1000 V.

In this regard, the EMF detector circuit may comprise an operational amplifier operably coupled to the antenna and outputting voltage or current signals indicative of the strength of EMF picked up by the antenna. Furthermore, the shovel may comprise a level sensor configured to discriminate between low voltages and high voltages according to a threshold. The level sensor may interface with the indicator to indicate the type of voltage level, such as by outputting a first low-voltage indication during the detection of low-voltage power cables and a second high-voltage indication for high-voltage power cables. For example, the indicator may comprise a visible light which may pulse orange during the detection of low-voltage power cables and red during the detection of high-voltage power cables.

Given that EMF decreases with distance, the detector circuit may be configured such that the detector circuit is able to substantially accurately differentiate between the low-voltage and high-voltage power cables when the tip of the blade is within a certain distance from a subsurface power cable.

As such, in use, the spotter may receive indications of the detection of EMF by the detector circuit and, after making inspectional excavations to partially expose the underground power cable conduit, hold the tip of the blade adjacent the power cable so as to receive a substantially accurate determination as to whether the subsurface power cable is a low-voltage or high-voltage power cable.

With reference to FIG. 3, electrical power cables may be reticulated within different types of supply conduits which may, for example, range between approximately 50-125 mm in diameter.

As such, the EMF detector circuit may be configured to accurately classify low or high-voltage power cables when the tip of the blade is held against these typical types of conduits and, in this regard, may be configured for discriminate in between low and high voltages at a distance of less than approximately 150 mm, so as to be usable with larger sized distribution conduits typically of 125 mm in diameter.

In embodiments, the distal edge of the blade may comprise a semicircular cutout, such as approximately of 50 mm in diameter, within which the power cable may be located so as to accurately classify the type of power cable at a set distance and location with respect to the EMF detector circuit. As such, the EMF detector circuit may detect the presence of EMF signals wherein, once the power cable conduit is located within the cutout, the safety shovel is able to then accurately classify the type of power cable inside, such as by discriminating between low and high-voltage power cables.

In embodiments, the level sensor voltage threshold may be adjusted in use to control the discrimination between low and high voltages. In this way, the user may adjust the safety shovel to control the discrimination between low and high voltages for known or typical conduit diameters or the particular voltage threshold. Alternatively, the user may periodically calibrate the safety shovel using known power cables and/or conduits.

In accordance with a further embodiment, the present safety shovel may distinguish between single phase and three phase power supply. In one embodiment, the safety shovel comprises a bandpass filter having a bandpass window at a single phase supply frequency (such as approximately 50 or 60 Hz) and a second bandpass window at a three phase power supply frequency approximately at three times the single phase frequency so as to be able to detect the sum of the single phase frequencies for each of a three phase power cable.

As such, in one embodiment, utilising the level sensor and the bandpass filter, the present safety shovel may be able to classify a subsurface power cable according to voltage level and phase type and control the indicator accordingly to provide indication of such.

In embodiments, the safety shovel may comprise low-cost analogue circuitry. However, in other embodiments, the present safety shovel may comprise a microcontroller executing various control modules including for configuration, signal analysis and indication.

In accordance with one aspect, there is provided an EMF detecting safety shovel comprising: a handle; a blade at a working end of the handle; EMF detection circuitry comprising: an antenna formed by the blade or being attached to the blade; an EMF detector circuit operably coupled to the antenna; and an indicator operably coupled to the EMF detector circuit, wherein, in use, the indicator provides an indication of the detection of EMF of a subsurface power cable and wherein the EMF detector circuit comprises a level sensor configured for discriminating between low and high voltages of the subsurface power cable and wherein the level sensor is operably coupled to the indicator to provide low and high voltage indications accordingly The level sensor may be configured for to discriminate between low voltages being less than approximately 1000 V and high voltages being greater than approximately 1000 V.

The EMF detector circuit may be configured for discriminating between the low and high voltages when an edge of the blade may be within a certain distance of the subsurface power cabling use.

The distance may be less than approximately 150 mm.

A voltage discrimination threshold of the level sensor may be configurable.

An edge of the blade may comprises a cutout for the partial receipt of the power cable therein for discriminating between the low and high voltages at a set distance and location with respect to the EMF detector circuit.

The handle may be electrically insulative.

The handle may comprises fibreglass.

The EMF detector circuit may comprises an input operational amplifier operably coupled to the antenna and configured for outputting signals indicative of the strength of EMF picked up by the antenna.

The EMF detector circuit may comprises at least one bandpass filter.

The at least one bandpass filter may comprises a bandpass window at a single phase supply frequency and a second bandpass window at a three phase supply frequency approximately three times the single phase supply frequency and wherein, in use, the bandpass filter may be operably coupled to the indicator to provide single and three phase indications accordingly.

The single phase supply frequency may be approximately at least one of 50 Hz or 60 Hz and wherein the three phase supply frequency may be approximately may be one of 150 Hz or 180 Hz.

The indicator may comprises a light output.

The indicator may comprises a sound output.

The EMF detecting safety shovel may further comprise a digital controller interfacing the EMF detector circuit and the indicator.

An analogue to digital converter interfaces the EMF detection circuit and the digital controller.

The EMF detecting safety shovel may further comprise a memory device operably connected to the digital controller.

The memory device may comprises a plurality of computer program code instruction modules for controlling the operation of the controller in use.

The computer program code instruction modules comprise a detector module.

The detector module may be configured for analysing an EMF waveform to discriminate between single and three phase supply.

The detector module may be configured for analysing and EMF waveform to discriminate between low and high voltages.

The computer program code instruction modules may comprises a signaller module configured for controlling the indicator.

The signaller module may be configured for controlling the indicator to indicate a standby mode of operation.

The signaller module may be configured for controlling the indicator to indicate the detection of EMF.

The signal module may be configured for controlling the indicator to indicate the detection of low or high voltage EMF.

The signaller module may be configured for controlling the indicator to indicate the detection of single phase or three-phase voltage EMF.

The EMF detecting safety shovel may further comprise a user interface operably connected to the controller and configured for configuring at least one operational setting.

The user interface may be located within the handle.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
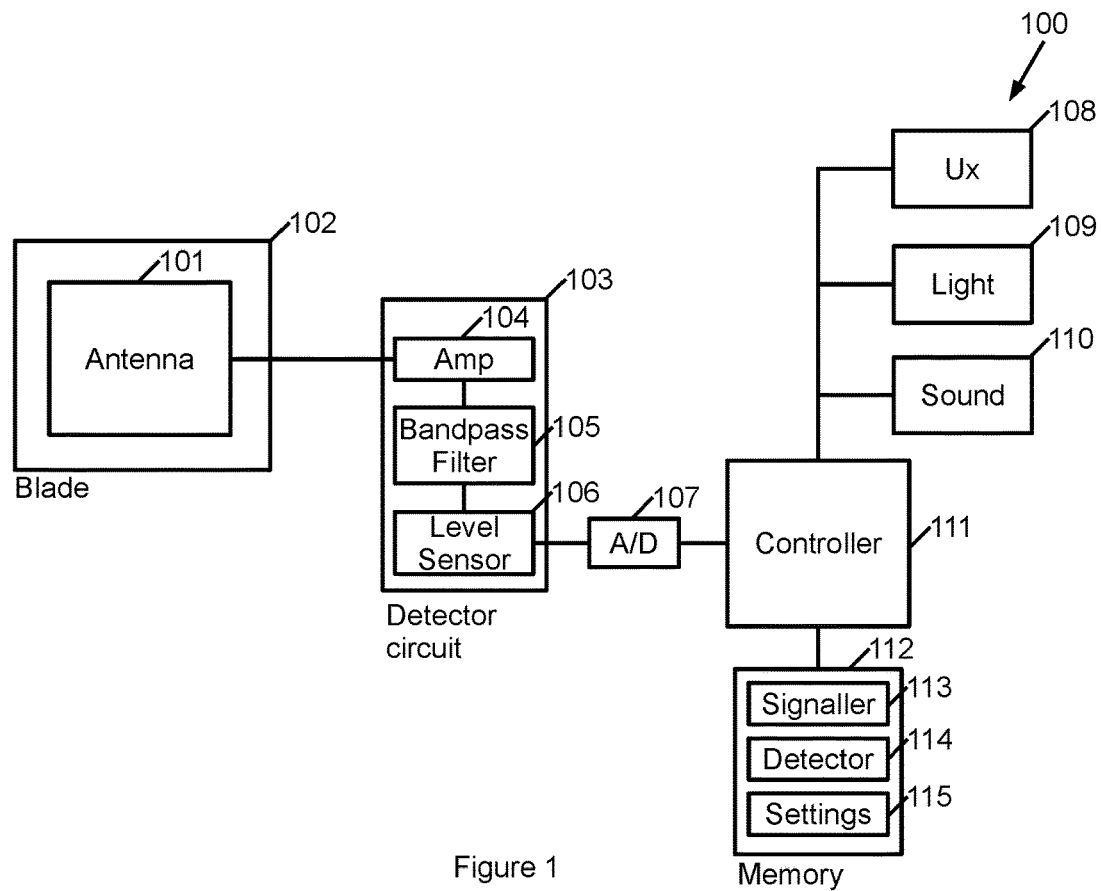
FIG. 1 shows a functional circuitry schematic of an EMF detecting safety shovel in accordance with an embodiment.

FIG. 1 shows a functional schematic of an electromagnetic field (EMF) detecting safety shovel 100 in accordance with an embodiment. An exemplary construction of the shovel 100 is provided in FIG. 2.

The safety shovel 100 comprises an elongate handle 118 terminating at a blade 121 at the end thereof. As such, the safety shovel 100 may be utilised in substantially the same manner as a conventional shovel. However, and as is provided herein, the safety shovel 100 comprises EMF detection circuitry for detecting EMF to detect subsurface AC power cables. In embodiments, the shovel may alternatively or additionally be able to measure an electromagnetic flux density (DC field) so as to detect DC power supply cables.

Figure 3:
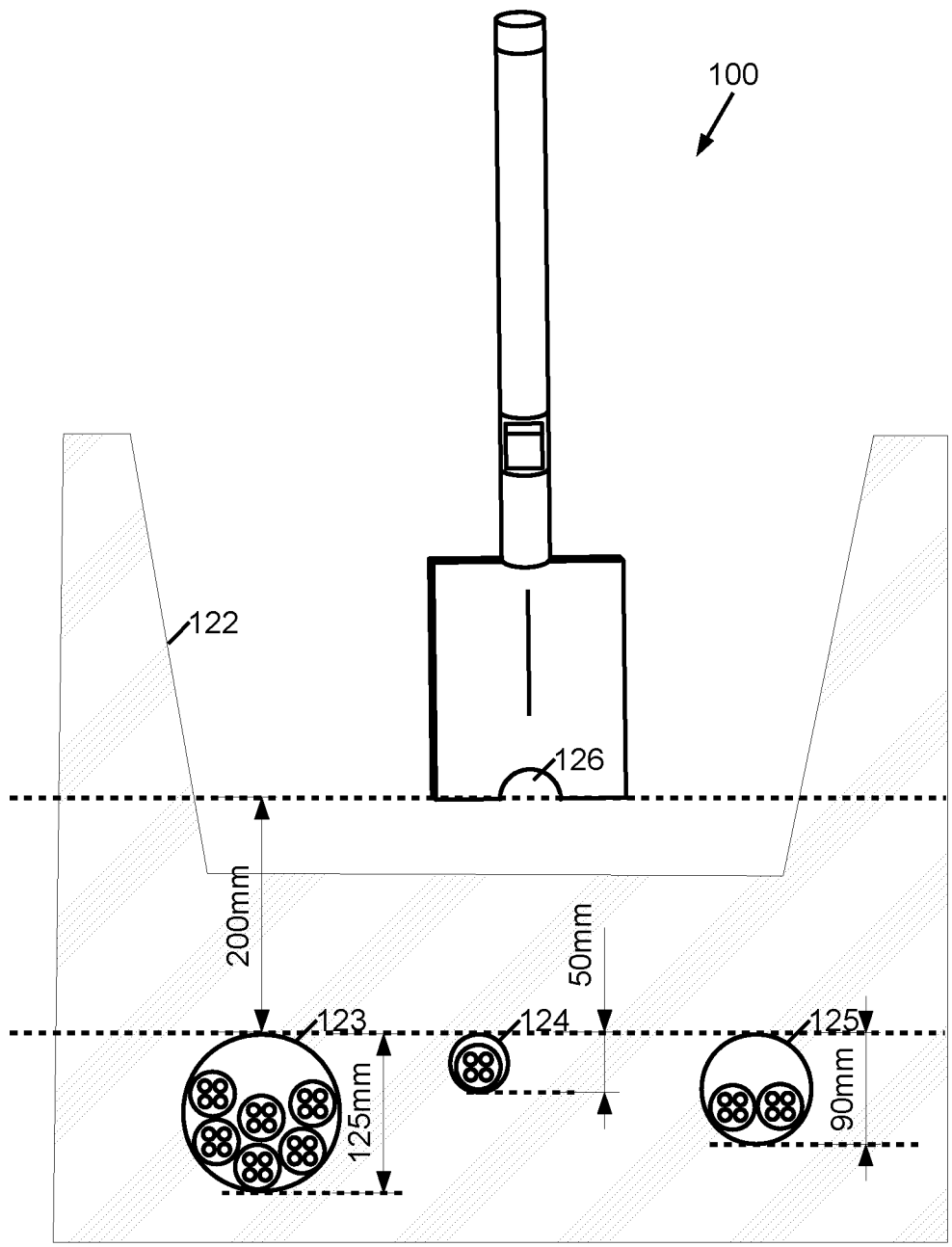
FIG. 3 shows an exemplary application of the EMF detecting safety shovel within an excavated trench for detecting various types of subsurface power cables.

FIG. 3 illustrates an exemplary application of the safety shovel 100 within an excavation 122 for the detection of various types of electrical conduits. For example, there is shown a low-voltage AC distribution conduit 123, typically approximately 125 mm in diameter and comprising a plurality of three-phase AC power cables. There is further shown a low-voltage AC lead in conduit 124 of approximately 50 mm in diameter. Yet further, there is shown a high-voltage AC distribution conduit 125 being approximately 90 mm in diameter.

In a preferred embodiment, EMF detection circuitry is able to detect and/or classify power cables within a certain distance from the edge of the blade 121, such as within approximately 155 mm from an edge of the blade so as to be usable with the typically larger sized distribute in conduit 123 shown in FIG. 3.

The handle 118 is preferably electrically insulative and may, for example, be manufactured from fibreglass or other sufficiently resilient and electrically insulative material.

The safety shovel 100 comprises an antenna 101 for picking up EMF. In embodiments, blade 121 may be metallic and the blade 121 itself forming the antenna 101. Alternatively, in embodiments, an antenna, such as a wire loop or the like may be adhered to an exterior surface or within the blade 121.

Operably coupled to the antenna 101 is an EMF detector circuit 103. In the embodiment shown in FIG. 1 the EMF detector circuit 103 may comprise an input operational amplifier 104 for converting and amplifying EMF signals received by the antenna 101 into voltage output signals.

A bandpass filter 105 (or two separate bandpass filters) may be utilised for frequency discrimination to typical identify electrical single phase power supply frequencies such as at 50 or 60 Hz or three phase supply multiples thereof, such as 150 Hz or 180 Hz. The output of the bandpass filter 150, or the output of each separate bandpass filters in embodiments, may be used to detect EMF at the single phase frequency or the three phase frequency so as to be able to control the indicator accordingly to indicate the type of power supply.

Furthermore, the detector circuit 103 may comprise a level sensor 106 for detecting the strength of the received EMF so as to distinguish between high and low voltage power cables.

For example low voltage (LV) power cables may be those between 50V AV and 1000 V AC and high voltage may exceed 1000 V AC.

Whereas it should be noted that the circuitry of the safety shovel 100 may be implemented utilising analog circuitry, the embodiment shown in FIG. 1 employs a digital controller 111. In this embodiment, the digital controller 111 may take the form of a low power microcontroller device.

An analogue to digital converter 107 may interface the EMF detector circuit 103 and the controller 111.

The safety shovel 100 further comprises an indicator which provides indications of the detection of subsurface power cable EMF.

In the embodiment shown in FIG. 1, the indicator may comprise a light 109 and/or sound output 110. As such, when detecting EMF, the light 109 may illuminate and/or the sound output 110 produce a sound. In embodiments, haptic output may be provided by electrical vibration devices.

Figure 2:
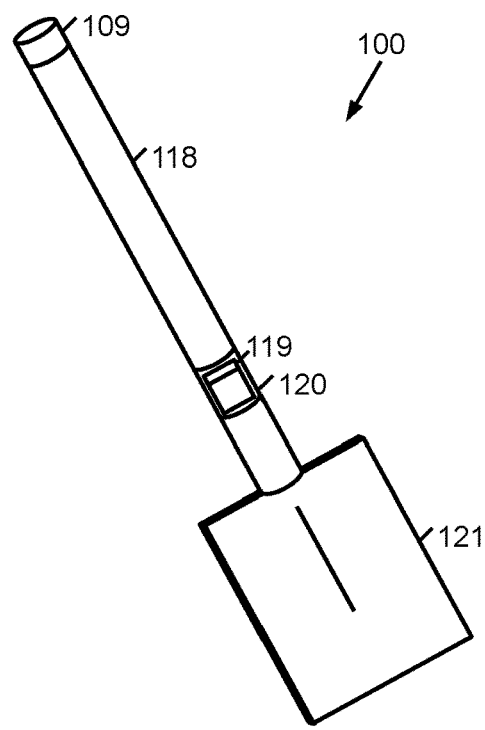
FIG. 2 shows an exemplary construction of the EMF detecting safety shovel in accordance with an embodiment.

In a preferred embodiment, the safety shovel 100 comprises both light 109 and sound 110 output for indication redundancy and in the embodiment shown in FIG. 2, the light 109 may be located visibly atop the handle 118.

A memory device 112 may be operably connected to the controller 111. The memory device 112 is configured for storing digital data including computer program code instructions and associated data. As such, in use, the controller 111 fetches these computer program code instructions and associated data from the memory device 112 for interpretation and execution.

As is shown in FIG. 1, the computer program code instructions have been shown as having been logically divided into various computer program code instruction modules. Specifically, as is shown, the memory 112 may comprise a detector model 114 for detecting and/or analysing the EMF signals received from the EMF detector circuit 103. Furthermore, the computer program code instruction modules may comprise a signal module configured for controlling the indicator.

The memory device 112 may further comprise various settings 115. As is shown in FIG. 2, the handle 118 may comprise an openable compartment 120 exposing a user interface 108 which may comprise a keypad and/or associated digital display 119 which may be utilised by the user for viewing various data, setting various operational settings and the like.

In embodiments, the controller 111 may control the light 109 to provide an operational indication such that the user is able to ascertain the operational state of the safety shovel 100. Specifically, the controller 111 may control the light 109 two pulse a green signal every 15 seconds, for example.

In use, when an EMF signal is detected by the antenna 101, the controller 111 may control the light 109 and the sound output 110 to provide an indication thereof.

As alluded to above, the bandpass filter 105 may pass 50 and/or 60 Hz frequencies so as to allow the safety shovel 100 to identify single phase mains power supply voltages. As opposed to utilising a bandpass filter 105, the frequency identification may be performed by the detector module 114.

As alluded to above, in embodiments wherein the safety shovel 100 is configured for differentiating between low voltage and high voltage, differing outputs may be output by the indicator accordingly. For example, when detecting low voltage power cables, the light 109 may pulse orange but pulse red for high-voltage power low voltage power cables.

In further embodiments, the safety shovel 100 is configured for differentiating between single phase and three phase supply by analysing the waveform detected by the antenna 101, including the frequency thereof. Such analysis may be conducted by the detector module 114.

In use, the user may utilise the user interface 108 to control the operation of the safety shovel 100, such as by configuring the various indicator outputs of the light 109 and sound output 110 according to differing detection scenarios including low and high-voltage detection, single and three phase detection and the like. For example, the user may configure the user interface 100 to configure the low-voltage/high-voltage threshold, such as being at 1000 V or otherwise.

In embodiment, the EMF detector circuit is configured to detect a live underground low-voltage AC power cable connected to a load which creates a current flow in the low-voltage AC power cable; a live underground low-voltage AC cable not connected to a load wherein the cable is carrying no current but is still hazardous if its live conductors come into contact with the spotter or some other worker or the excavator and its operator; and a live underground high-voltage AC cable supplying current to numerous low-voltage loads via a transformer and low-voltage AC power cables. In this regard, the level sensor operably coupled to the antenna may be used to distinguish between the low-voltage and high-voltage AC cables. Furthermore, a proximity current sensor, such as a Hall effect or Rogowski coil transducer may be used to detect the current flow.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An EMF detecting safety shovel comprising:
   a handle;
   a blade at a working end of the handle;
   EMF detection circuitry comprising:
      an antenna formed by the blade or being attached to the blade;
      an EMF detector circuit operably coupled to the antenna; and
      an indicator operably coupled to the EMF detector circuit, wherein:
   in use, the indicator provides an indication of the detection of EMF of a subsurface power cable;
   wherein the EMF detector circuit comprises a level sensor configured for discriminating between low and high voltages of the subsurface power cable;
   the level sensor is operably coupled to the indicator to provide low and high voltage indications accordingly;
   the level sensor is configured to discriminate between low voltages being less than approximately 1000 V and high voltages being greater than approximately 1000 V; and
   an edge of the blade comprises a cutout for the partial receipt of the power cable therein for discriminating between the low and high voltages at a set distance and location with respect to the EMF detector circuit.

2. The EMF detecting safety shovel as claimed in claim 1, wherein the EMF detector circuit is configured for discriminating between the low and high voltages when an edge of the blade is within a certain distance of the subsurface power cable.

3. The EMF detecting safety shovel as claimed in claim 2, wherein the distance is less than approximately 150 mm.

4. The EMF detecting safety shovel as claimed in claim 1, wherein a voltage discrimination threshold of the level sensor is configurable.

5. The EMF detecting safety shovel as claimed in claim 1, wherein the handle is electrically insulative.

6. The EMF detecting safety shovel as claimed in claim 5, wherein the handle comprises fibreglass.

7. The EMF detecting safety shovel as claimed in claim 1, wherein the EMF detector circuit comprises an input operational amplifier operably coupled to the antenna and configured for outputting signals indicative of the strength of EMF picked up by the antenna.

8. The EMF detecting safety shovel as claimed in claim 1, wherein the EMF detector circuit comprises at least one bandpass filter.

9. The EMF detecting safety shovel as claimed in claim 8, wherein the at least one bandpass filter comprises a bandpass window at a single phase supply frequency and a second bandpass window at a three phase supply frequency approximately three times the single phase supply frequency and wherein, in use, the bandpass filter is operably coupled to the indicator to provide single and three phase indications accordingly.

10. The EMF detecting safety shovel as claimed in claim 9, wherein the single phase supply frequency is approximately at least one of 50 Hz or 60 Hz and wherein the three phase supply frequency is approximately is one of 150 Hz or 180 Hz.

11. The EMF detecting safety shovel as claimed in claim 1, wherein the indicator comprises a light output.

12. The EMF detecting safety shovel as claimed in claim 1, wherein the indicator comprises a sound output.

13. The EMF detecting safety shovel as claimed in claim 1, further comprising a digital controller interfacing the EMF detector circuit and the indicator.

14. The EMF detecting safety shovel as claimed in claim 13, wherein an analogue to digital converter interfaces the EMF detection circuit and the digital controller.

15. The EMF detecting safety shovel as claimed in claim 13, further comprising a memory device operably connected to the digital controller.

16. The EMF detecting safety shovel as claimed in claim 15, wherein the memory device comprises a plurality of computer program code instruction modules for controlling the operation of the controller in use.

17. The EMF detecting safety shovel as claimed in claim 16, wherein the computer program code instruction modules comprise a detector module.

18. The EMF detecting safety shovel as claimed in claim 17, wherein the detector module is configured for analysing an EMF waveform to discriminate between single and three phase supply.

19. The EMF detecting safety shovel as claimed in claim 17, wherein the detector module is configured for analysing and EMF waveform to discriminate between low and high voltages.

20. The EMF detecting safety shovel as claimed in claim 16, wherein the computer program code instruction modules comprises a signaller module configured for controlling the indicator.

21. The EMF detecting safety shovel as claimed in claim 20, wherein the signaller module is configured for controlling the indicator to indicate a standby mode of operation.

22. The EMF detecting safety shovel as claimed in claim 20, wherein the signaller module is configured for controlling the indicator to indicate the detection of EMF.

23. The EMF detecting safety shovel as claimed in claim 20, wherein the signaller module is configured for controlling the indicator to indicate the detection of low or high voltage EMF.

24. The EMF detecting safety shovel as claimed in claim 20, wherein the signaller module is configured for controlling the indicator to indicate the detection of single phase or three-phase voltage EMF.

25. The EMF detecting safety shovel as claimed in claim 13, further comprising a user interface operably connected to the controller and configured for configuring at least one operational setting.

26. The EMF detecting safety shovel as claimed in claim 25, wherein the user interface is located within the handle.

* * * * *